3,632,821
Patented Jan. 4, 1972

3,632,821
PYRAN-CARBOXYLIC ACID ANILIDES
Otto Scherer, Bad Soden, Taunus, and Günther Heubach, Kelkheim, Taunus, Germany, assignors to Farbwerke Hoechst Aktiengesellschaft vormals Meister Lucius & Brüning, Frankfurt am Main, Germany
No Drawing. Filed Jan. 14, 1969, Ser. No. 791,134
Claims priority, application Germany, Jan. 22, 1968, P 16 68 899.6
Int. Cl. C07d 7/10
U.S. Cl. 260—345.7         8 Claims

ABSTRACT OF THE DISCLOSURE 2-methyl-5,6-dihydropyran-3-carboxylic acid anilides of the general formula

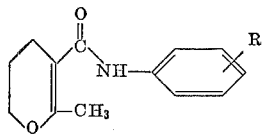

in which R stands for hydrogen, methyl or methoxy in the meta, ortho or para-position in the benzene nucleus. The novel compounds are used as fungicides.

---

The present invention relates to 2-methyl-5,6-dihydropyran-3-carboxylic acid anilides of the general Formula 1

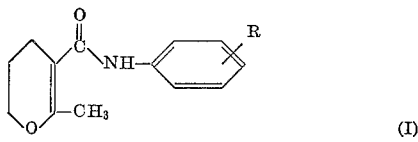

(I)

in which R stands for hydrogen, a methyl group or methoxy group, the substituents being in metal, ortho or para-position of the benzene nucleus.

The present invention also relates to plant protecting agents containing the aforesaid carboxylic acid anilides (I) as active ingredient.

It is known that compounds of similar constitution such as 2,3 - dihydro-5-carboxanilido-6-methyl-1,4-oxathiine (II) and 2,3-dihydro-5-carboxanilido-6-methyl-1,4-oxathine-4 dioxide (III) have fungicidal action (cf. U.S. Pat. 3,249,499 and Belgian Pat. 679,984, pages 19 and 29).

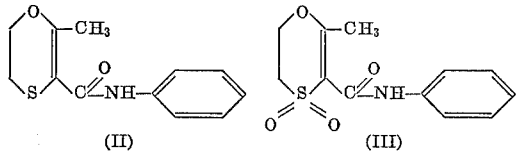

Known compound (II) has good action against smut but only minor systemic action against rust. Known compound (III) has good systemic and seed treating effects, but no prophylactic action against rust and an unsatisfactory action in the treatment of smut.

The novel compounds of Formula I are superior to known compounds II and III. With respect to known compound II the superiority is especially pronounced in the systemic effect and the seed treating effect and as compared with known compound III the prophylactic action and the action against smut are much better.

Systemic effect means an inner therapeutic effect after the absorption of the active ingredient either by the leaves or by the seeds. After germination of the treated seeds, especially cereals, the active ingredient is transported to other parts of the plant which have not been treated and thus protects the plant against fungus infestation.

A special advantage of the novel compounds I is that they combine the fungicidal properties of known compounds II and III. That means that it is no longer necessary first to apply one known compound and at a later stage of growth of the plant another known compound to prevent infestation with fungi, for example of cereals. One treatment with a novel compound of Formula I, either of the seeds or of the plant in an early stage of growth, is sufficient to protect the plant against fungus disease. The novel compounds of Formula I are, for example, significantly superior to known compounds II and III in the fight against the soil fungus Rhizoctonia.

Another object of this invention is a process for preparing 2-methyl-5,6-dihydropyran-3-carboxylic acid anilides of Formula I which comprises:

(A) Reacting 2 - methyl-5,6-dihydropyran-3-carboxylic acid with a chlorination agent to yield 2-methyl-5,6-dihydropyran-3-carboxylic acid chloride which is then reacted with anilines which may carry appropriate substituents in the presence of an inorganic or tertiary organic base, or (B) Reacting at elevated temperature 2-methyl-5,6-dihydropyran-3-carboxylic acid with phenyl isocyanates which may carry appropriate substituents.

As chlorination agent phosphorus trichloride is preferred. Phosphorus pentachloride, thionyl chloride and phosphorus oxychloride may also be used. The chlorination is carried out at a temperature in the range from −20° C. to +100° C., a temperature range from 0° C. to 30° C. being preferred.

The chlorination is suitably carried out in an inert solvent such as carbon tetrachloride, chloroform, methylene chloride, ethylene chloride, toluene or benzene.

The reaction of the acid chloride with anilines optionally carrying methyl or methoxy substituents in the meta, ortho or para position in the benzene nucleus is performed in the presence of an inorganic or a tertiary organic base. Suitable inorganic bases are in the first place sodium hydroxide and potassium hydroxide. As tertiary organic bases triethyl amine, dimethyl aniline or pyridine and the homologs thereof may be used. An excess of corresponding aromatic amines may also be used.

The 2-methyl-5,6-dihydropyran-3-carboxylic acid is reacted with phenyl isocyanates optionally carrying methyl or methoxy substituents in the benzene nucleus at a temperature in the range of from 80° C. to 180° C., preferably 140° C. to 170° C. When the reaction is terminated it is expedient to remove excess phenyl isocyanate from the reaction product by washing it with an inert solvent such as carbon tetrachloride or gasoline.

2-methyl-5,6-dihydropyran-3-carboxylic acid anilides of Formula I according to the invention are used as active ingredients in pesticides, above all as fungicides. They are especially effective against rust and smut fungi, for example yellow and brown rust of wheat, smut and stinking smut and soil fungi, for example Rhizoctonia. They can be applied either as plant protecting agents or seed protecting agents.

The active ingredients according to the invention can be used in admixture with the usual solid or liquid inert carrier materials, with adhesive, wetting, dispersing and grinding auxiliaries in the form of wettable powders, emulsions, suspensions, dusts or granules. They can be mixed with other pesticides with which they form compatible mixtures.

Suitable carrier materials are mineral substances such as aluminum silicates, argillaceous earths, kaolin, chalks, siliceous chalks, talcum, kieselguhr, or hydrated silicic acid, as well as mixtures of the said mineral substances with special additives, for example chalk in admixture with sodium stearate. As carrier materials for liquid preparations there can be used all common and suitable solvents, for example toluene, xylene, diacetone alcohol, cyclohexanone, isophorone, gasolines, paraffin oils, dioxane, dimethyl formamide, dimethyl sulfoxide, ethyl acetate, butyl acetate, tetrahydrofurane, chlorobenzene and the like.

As adhesives glutinous cellulose products or polyvinyl alcohols may be used.

Suitable wetting agents are all appropriate emulsifiers such as hydroxyethylated alkyl phenols, salts of aryl and alkylaryl sulfonic acids, salts of methyl-taurine, salts of phenylkogasin sulfonic acids or soaps.

Dispersing agents to be used are salts of lignin-sulfonic acid, salts of naphthalene sulfonic acid and possibly hydrated silicic acid or kieselguhr.

As grinding auxiliaries there may be used suitable inorganic or organic salts, for example sodium sulfate, ammonium sulfate, sodium carbonate, sodium bicarbonate, sodium thiosulfate, sodium stearate or sodium acetate.

The following examples serve to illustrate the invention but they are not intended to limit it thereto.

EXAMPLE 1

14.2 grams of 2-methyl-5,6-dihydropyran-3-carboxylic acid were dissolved in 70 milliliters of absolute benzene and 8.5 milliliters of thionyl chloride were added at 22° C. After standing for 2½ hours the reaction mixture was concentrated to one fourth of the original volume under reduced pressure. The crude acid chloride thus obtained was dropped over a period of 40 minutes into a solution of 9.3 grams of aniline and 9.5 grams of pyridine in 100 milliliters of benzene, which solution was stirred at −5° C. The reaction mixture was then stirred for another hour without cooling and finally poured onto ice. The benzenic solution was separated and washed with water. 16.3 grams of 2-methyl-5,6-dihydropyran-3-carboxylic acid anilide were obtained from the dried benzenic solution, corresponding to a yield of 75% of the theoretical. After recrystallization from methanol/water with the addition of active charcoal the compound melted at 108–109° C.

*Analysis.*—Calculated for $C_{13}H_{15}NO_2$ (molecular weight 217.26), (percent): C, 72.0; N, 6.4. Found (percent): C, 72.2; H, 7.0; N, 6.7.

The infrared spectrum of the novel compound showed characteristic peaks at $3.05\mu$, $6.08\mu$ and $6.13\mu$.

EXAMPLE 2

14.2 grams of 2-methyl-5,6-dihydropyran-3-carboxylic acid and 11.9 grams of phenyl isocyanate (0.1 mole each) were heated for 45 minutes at 160° C. After cooling the crystals were washed with benzene to remove unreacted phenyl isocyanate and the residue was recrystallized from alcohol/water.

17.6 grams of 2-methyl-5,6-dihydropyran-3-carboxylic acid anilide were obtained, corresponding to a yield of 81% of the theoretical. The compound melted at 108–109° C. The analytical data and peaks of infrared spectrum were identical with those of the compound of Example 1.

EXAMPLE 3

To prepare the 2-methyl-5,6-dihydropyran-3-carboxylic acid anilides according to the invention, 0.1 mole of 2-methyl-5,6-dihydropyran-3-carboxylic acid chloride was suspended in 25 milliliters of ethylene chloride, 0.05 mole of phosphorus trichloride was added and the suspension was allowed to stand for 1⅓ hours at room temperature, moisture being excluded. After separation of the phosphorous acid forming the lower liquid layer, the solvent was distilled off under reduced pressure. The crude acid chloride thus obtained was dropped at 0° C. into a solution of 0.1 mole of the respective aromatic amine substituted in the benzene nucleus and 0.12 mole of pyridine in 100 milliliters of benzene. After standing for one hour at room temperature the reaction mixture was poured into water, the organic phase was washed with dilute hydrochloric acid and water and the solvent was distilled off.

The following compounds were prepared in this manner:

(a) 2-methyl-5,6-dihydropyran-3-carboxylic acid-(m-methylanilide) using m-toluidine, yield 78% of the theoretical, calculated on the carboxylic acid used, melting point 96.5–97.5° C.

(b) 2-methyl-5,6-dihydropyran-3-carboxylic acid (o-methylanilide) using o-toluidine, yield 75% of the theoretical, melting point 128–128.5° C.

(c) 2-methyl-5,6-dihydropyran-3-carboxylic acid (p-methylanilide) using p-toluidine, yield 80% of the theoretical, melting point 125–126° C.

(d) 2-methyl-5,6-dihydropyran-3-carboxylic acid (m-methoxyanilide) using m-anisidine, yield 73% of the theoretical, melting point 104–105° C.

(e) 2-methyl-5,6-dihydropyran-3-carboxylic acid (o-methoxyanilide) using o-anisidine, yield 78% of the theoretical, melting point 131–132° C.

(f) 2-methyl-5,6-dihydropyran-3-carboxylic acid (p-methoxyanilide) using p-anisidine, yield 79% of the theoretical, melting point 155–156° C.

In the following Examples 4 to 6 the following compounds were tested:

(I) 2-methyl-5,6-dihydropyran-3-carboxylic acid anilide
(II) 2,3-dihydro-5-carboxanilido-6-methyl-1,4-oxathiine
(III) 2,3-dihydro - 5 - carboxanilido-6-methyl-1,4-oxathiine-4,4-dioxide (I) is a novel compound according to the invention
(II) is a compound disclosed in U.S. Pat. 3,249,499
(III) is a compound disclosed in Belgian Pat. 679,984.

EXAMPLE 4

Wheat (Triticum) was grown in pots and treated in the three leaves stage with compound (I) in concentrations of 7.5, 15, 30, 60 and 120 milligrams of active ingredient per liter of spray liquor. Each test was repeated four times, i.e., for each concentration 4 pots each containing 10 wheat plants were used. For comparison there was used untreated wheat and wheat treated with compounds (II) and (III) in the same concentrations.

One day after drying of the coating of active ingredient the plants were infested with a spore suspension of yellow rust of wheat (*Puccinia striiformis*) and placed for 12 hours in a moist atmosphere. After infestation the plants were kept in the greenhouse and evaluated after 4 weeks. The numbers in the following table indicate the percentage of plants infested with rust with the respective concentration of active ingredient.

Table 1 shows that compound (I) had a better effect than compound (II) and a much better effect than compound (III). Down to a concentration of active ingredient of 30 milligrams per liter of spray liquor the plants remained free from infestation. Hence, it follows that for the prophylactic treatment of plants one day before infestation compound (I) of the invention is far superior to known compound (III).

TABLE 1

Prophylactic treatment of winter wheat against yellow rust one day before infestation. Evaluation of the effect 4 weeks after infestation

| Active ingredient | Percent of infestation with yellow rust with— | | | | |
| --- | --- | --- | --- | --- | --- |
| | 120 mg.[1] | 60 mg.[1] | 30 mg.[1] | 15 mg.[1] | 7.5 mg.[1] |
| I | 0 | 0 | 0 | 5 | 10 |
| II | 0 | 0 | 0 | 10 | 15 |
| III | 15 | 35 | 60 | 100 | 100 |
| Untreated | 100 | 100 | 100 | 100 | 100 |

[1] Milligrams of active ingredient per liter.

Seeds of wheat were treated for 10 minutes with compound (I) in concentrations of 250, 125 and 60 grams of active ingredient per 100 kilograms of seeds. For comparison, seeds were treated in the same manner with compounds (II) and (III) in the same concentrations.

The seeds treated in this manner were sown 14 days after the treatment. After germination of the seeds the plants were artificially infested in the three to four leaves stage with spores of brown rust of wheat (*Puccinia triticina*). Four weeks after infestation the treated plants and untreated control plants were evaluated as to the rust infestation.

The following Table 2 shows that compound (I) in concentrations of 250 and 125 milligrams per 100 kilograms of seeds ensured a full protection against brown rust. Known compound (III) had a similar effect whereas compound (II), when used in the same concentrations, had no effect at all. Hence, it follows that compound (I) is far superior as seed treating agent to known compound (II).

TABLE 2.—SEED TREATMENT OF WINTER WHEAT

| Active ingredient | Percent of infestation with brown rust after seed treatment with— | | |
|---|---|---|---|
| | 250 g.[1] | 125 g.[1] | 60 g.[1] |
| I | 0 | 0 | 18 |
| II | 100 | 100 | 100 |
| III | 0 | 5 | 15 |
| Untreated | 100 | 100 | 100 |

[1] Grams of active ingredient per 100 kilograms of seeds.

EXAMPLE 6

Wheat was grown in pots and treated in four repetitions in the two leaves stage with compound (I) with concentrations of 250, 125, 60, 30 and 15 milligrams of active ingredient per liter of spray liquor. For comparison, compounds (II) and (III) were used in the same manner and some plants were not treated.

Seven days after spraying with the spray liquor the treated leaves were carefully cut off. Five weeks thereafter the newly grown leaves, which had not been treated with the active ingredient, were infested with a suspension of spores of brown rust of wheat and the plants were placed in a moist atmosphere. After 12 hours the plants were brought into a greenhouse. Three weeks after infestation the plants were evaluated.

The following Table 3 shows that compound (I) had a good systemic action against the infestation which was approximately equal to the action of known compound (III). Known compound (II) exhibited a very weak systemic action only. Hence, it follows that compound (I) is surprisingly superior to known compound (II).

TABLE 3.—SYSTEMIC ACTION AGAINST BROWN RUST OF WHEAT

| Active ingredient | Percent of infestation with brown rust with— | | | | |
|---|---|---|---|---|---|
| | 250 mg.[1] | 125 mg.[1] | 60 mg.[1] | 30 mg.[1] | 15 mg.[1] |
| I | 0 | 0 | 5 | 15 | 30 |
| II | 15 | 35 | 100 | 100 | 100 |
| III | 0 | 3 | 10 | 15 | 25 |
| Untreated | 100 | 100 | 100 | 100 | 100 |

[1] Milligrams of active ingredient per liter of spray liquor.

Plants of wheat grown in pots in the greenhouse were treated in the two leaves stage with the following compounds according to the invention with concentrations of 400, 200, 100 and 50 milligrams of active ingredient per liter of spray liquor.

(A) 2-methyl-5,6-dihydropyran-3-carboxylic acid-(m-methylanilide)
(B) 2-methyl-5,6-dihydropyran-3-carboxylic acid-(o-methylanilide)
(C) 2-methyl-5,6-dihydropyran-3-carboxylic acid-(p-methylanilide)
(D) 2-methyl-5,6-dihydropyran-3-carboxylic acid-(m-methoxyanilide)
(E) 2-methyl-5,6-dihydropyran-3-carboxylic acid-(o-methoxyanilide)
(F) 2-methyl-5,6-dihydropyran-3-carboxylic acid-(p-methoxyanilide).

In the same manner and with the same concentrations the following compounds known as fungicides were used for comparison:

(II) 2,3-dihydro-5-carboxanilide-6-methyl-1,4-oxathiine and
(IV) zinc-ethylene-bis-dithiocarbamate.

Control plants were treated with tap water without active ingredient.

Five days after the treatment the two treated leaves were cut off at the basis. Five weeks thereafter the newly grown leaves were strongly infested with a suspension of spores of black rust of wheat (*Puccinia graminis*), the plants were kept for 12 hours in a moist atmosphere and then brought into a greenhouse. Three weeks after infestation the plants were evaluated.

The following Table 4 shows that compounds (A) to (F) according to the invention had an excellent systemic effect against rust of wheat which was superior to the effect of known compound (II). Compound (IV) used for comparison had no systemic effect.

TABLE 4

| Compound | Percent of black rust of wheat after treatment with— | | | |
|---|---|---|---|---|
| | 400 mg.[1] | 200 mg.[1] | 100 mg.[1] | 50 mg.[1] |
| (A) | 0 | 0 | 0 | 5 |
| (B) | 0 | 0 | 0 | 3 |
| (C) | 0 | 15 | 23 | 35 |
| (D) | 0 | 0 | 3 | 10 |
| (E) | 0 | 0 | 10 | 15 |
| (F) | 0 | 0 | 15 | 25 |
| (II) | 10 | 35 | 60 | 100 |
| (IV) | 100 | 100 | 100 | 100 |
| Untreated | 100 | 100 | 100 | 100 |

[1] Milligrams of active ingredient per liter of spray liquor.

EXAMPLE 8

Seeds of wheat of the type "Heine VII" were treated in a drum for 10 minutes in usual manner with compounds (A) to (F) according to the invention (cf. Example 7) in concentrations of 200, 100 and 50 grams of active ingredient per 100 kilograms of seeds. For comparison, some of the seeds were treated in analogous manner with known compound (II). The seeds were sown 14 days after the treatment. After germination the plants were infested in the three and four leaves stage with spores of yellow rust of wheat (*Puccinia striiformis*).

Four weeks after infestation the plants were examined and the degree of infestation was determined.

The following Table 5 shows that compounds (A) to (F) according to the invention had a very good systemic action against yellow rust when used as seed treating agent. Under the indicated conditions, comparative compound (II) did not exhibit any effect.

TABLE 5

| Compound | Percent of infestation with yellow rust of wheat after treatment with— | | |
|---|---|---|---|
| | 200 g.[1] | 100 g.[1] | 50 g.[1] |
| (A) | 0 | 0 | 15 |
| (B) | 0 | 10 | 31 |
| (C) | 0 | 15 | 35 |
| (D) | 0 | 3 | 20 |
| (E) | 0 | 15 | 41 |
| (F) | 0 | 23 | 48 |
| (II) | 100 | 100 | 100 |
| Untreated | 100 | 100 | 100 |

[1] Grams of active ingredient per 100 kilograms of seeds.

EXAMPLE 9

Oat seeds of the type "Flämingstreue" were strongly infested with spores of loose smut of oats (*Ustilago avenae*). The infested seeds were treated in usual manner for 10 minutes in a drum with compounds (A) to (F) according to the invention in concentrations of 100, 50 and 25 grams of active ingredient per 100 kilograms of seeds. For comparison, part of the seeds were treated with the known 2,3-dihydro-5-carboxanilido-6-methyl-1,4-oxathiine-4-dioxide (III) in the same concentrations. The seeds were sown 14 days after the treatment. After formation of the panicles the plants were examined as to the infestation with smut.

The following Table 6 shows that compounds (A) to (F) according to the invention had a distinctly better effect against loose smut of oats than comparative compound (III).

TABLE 6

Percent of infestation with loose smut of oats after treatment with—

| Compound | 100 g.[1] | 50 g.[1] | 25 g.[1] |
|---|---|---|---|
| (A) | 0 | 0 | 0 |
| (B) | 0 | 0 | 0 |
| (C) | 0 | 0 | 5 |
| (D) | 0 | 0 | 3 |
| (E) | 0 | 5 | 15 |
| (F) | 0 | 0 | 5 |
| (III) | 0 | 12 | 35 |
| Untreated | 68 | 71 | 64 |

[1] Grams of active ingredient per 100 kilograms of seeds.

EXAMPLE 10

Winter wheat of the type "Heine VII" was treated in the three leaves stage with compounds according to the invention:

(I) 2-methyl-5,6-dihydropyran-3-carboxylic acid anilide and (A) 2-methyl-5,6-dihydropyran-3-carboxylic acid-(m-methylanilide) and with known compounds (II) 2,3-dihydro-5-carboxanilido-6-methyl-1,4-oxathiine and (III) 2,3-dihydro-5-carboxanilido-6-methyl-1,4-oxathiine-4,4-dioxide in concentrations of 120, 60, 30, 15, and 7.5 milligrams of active ingredient per liter of spray liquor. Control plants were sprayed with water only.

After drying of the coating of active ingredients the plants were infested with a spore suspension of yellow rust of wheat and placed for 12 hours in a moist atmosphere. Four weeks after infestation the plants were examined as to the infestation with yellow rust. The result indicated in the following Table 7 show that compounds (I) and (A) according to the invention had a distinctly better effect in the same concentrations than known compound (II). As compared with compound (III) the effect is still more pronounced.

TABLE 7

Prophylactic treatment of winter wheat against yellow rust one day before infestation. Evaluation of the effect four weeks after infestation

| Active ingredient | Percent of infestation with yellow rust of wheat with concentrations of— | | | | |
|---|---|---|---|---|---|
| | 120 mg.[1] | 60 mg.[1] | 30 mg.[1] | 15 mg.[1] | 7.5 mg.[1] |
| (I) | 0 | 0 | 0.5 | 8.3 | 15.1 |
| (A) | 0 | 0 | 2.3 | 10.9 | 20.7 |
| (II) | 0 | 2.3 | 5.9 | 15.4 | 35.2 |
| (III) | 28.7 | 53.9 | 85.3 | 100 | 100 |
| Untreated | 100 | 100 | 100 | 100 | 100 |

[1] milligrams of active ingredient per liter of spray liquor.

EXAMPLE 11

Cottonseed (Gossypium) freed lint by means of acid and infested with *Rhizoctonia solani* was mixed for 10 minutes in a drum with compounds (A) and (I) of the invention specified in Example 10 and with compounds (II) and (III) also specified in the said example in concentrations of 160, 80, 40, 20 and 10 grams of active ingredients per 100 kilograms of seed. Control seeds remained untreated. The seeds were kept for 24 hours in a closed box and then sown in four repetitions, each time 100 grains, in garden mould also infested with *Rhizoctonia solani*.

Four weeks after germination the plants were examined as to their infestation with the soil fungus. The following Table 8, in which the average values of infestation are given, shows that compounds (I) and (A) according to the invention were significantly superior to the known comparative compounds (II) and (III).

TABLE 8

Treatment of cottonseed, evaluation four weeks after infestation

| Compound | Percent of infestation with Rhizoctonia with— | | | | |
|---|---|---|---|---|---|
| | 160 g.[1] | 80 g.[1] | 40 g.[1] | 20 g.[1] | 10 g.[1] |
| (I) | 0 | 0.2 | 2.3 | 4.0 | 10.6 |
| (A) | 0 | 1.3 | 5.1 | 9.7 | 15.2 |
| (II) | 8.2 | 15.3 | 23.9 | 34.6 | 56.1 |
| (III) | 15.9 | 23.6 | 45.0 | 59.3 | 74.9 |
| Untreated | 100 | 100 | 100 | 100 | 100 |

[1] Grams of active ingredient per 100 kilograms of seeds.

EXAMPLE 12

Seeds of winter wheat were mixed for 10 minutes in a drum with compounds (I) and (A) of the invention specified in Example 10 and with known compounds (II) and (III) in concentrations of 100, 75, 50 and 25 grams of active ingredient per 100 kilograms of seeds. Part of the seeds remained untreated for a control test. 10 Days after the treatment the seeds were sown in garden mould. For each concentration and active ingredient four times 100 seed grains were sown.

After germination of the wheat the plants were artificially infested in the three to four leaves stage with spores of brown rust of wheat. Four weeks after infestation the treated plants and the untreated control plants were examined.

The following Table 9 shows the average results of the examination. It can be seen that compounds (I) and (A) of the invention were significantly superior to known compounds (II) and (III).

TABLE 9

Seed treatment of winter wheat, infestation with brown rust of wheat after germination

| Active ingredient | Percent of infestation with brown rust with— | | | |
|---|---|---|---|---|
| | 100 g.[1] | 75 g.[1] | 50 g.[1] | 25 g.[1] |
| (I) | 0 | 5.2 | 8.7 | 15.3 |
| (A) | 0 | 7.3 | 15.9 | 23.8 |
| (II) | 100 | 100 | 100 | 100 |
| (III) | 9.5 | 12.9 | 34.2 | 67.3 |
| Untreated | 100 | 100 | 100 | 100 |

[1] Grams of active ingredient per 100 kilograms of seeds.

What is claimed is:

1. 2-methyl - 5,6 - dihydropyran - 3 - carboxylic acid anilides of the general Formula I

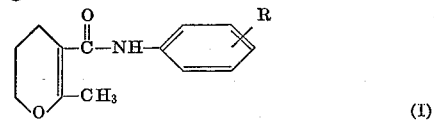

(I)

in which R stands for hydrogen, a methyl group or a methoxy group substituting the meta, ortho or para position of the benzene nucleus.

2. 2 - methyl - 5,6 - dihydropyran-3-carboxylic acid anilide.

3. 2 - methyl - 5,6 - dihydropyran-3-carboxylic acid (m-methylanilide).

4. 2 - methyl - 5,6 - dihydropyran-3-carboxylic acid-(o-methyl)anilide.

5. 2 - methyl - 5,6 - dihydropyran-3-carboxylic acid-(p-methylanilide).

6. 2 - methyl - 5,6 - dihydropyran-3-carboxylic acid-(m-methoxyanilide).

7. 2 - methyl - 5,6 - dihydropyran-3-carboxylic acid-(o-methoxyanilide).

8. 2 - methyl - 5,6 - dihydropyran-3-carboxylic acid-(p-methoxyanilide).

References Cited

UNITED STATES PATENTS 2,378,996   6/1945   Freure _____ 260—345.7
2,436,645   2/1948   Hawkins et al. _____ 260—345.7

NORMA S. MILESTONE, Primary Examiner

U.S. Cl. X.R.

424—283

UNITED STATES PATENT OFFICE
CERTIFICATE OF CORRECTION

Patent No. 3,632,821　　　　　　　　Dated　January 4, 1972

Inventor(s)　Scherer and Heubach

It is certified that error appears in the above-identified patent and that said Letters Patent are hereby corrected as shown below:

In the Heading:

After "P 16 68 899.6" insert --and

September 27, 1968, Germany, P 17 93 502.3--.

Signed and sealed this 2nd day of May 1972.

(SEAL)
Attest:

EDWARD M. FLETCHER, JR.　　　　　　ROBERT GOTTSCHALK
Attesting Officer　　　　　　　　　Commissioner of Patents